United States Patent [19]
Uhlig

[11] 3,983,199
[45] Sept. 28, 1976

[54] METHOD FOR MAKING PLASTIC ARTICLES HAVING BLOWN AND NON-BLOWN PORTIONS

[75] Inventor: Albert R. Uhlig, Toledo, Ohio

[73] Assignee: Owens-Illinois, Inc., Toledo, Ohio

[22] Filed: Oct. 15, 1974

[21] Appl. No.: 514,830

[52] U.S. Cl. .................................. 264/89; 264/98; 264/161; 264/163; 264/296; 425/DIG. 214; 425/DIG. 215
[51] Int. Cl.² ................... B29C 17/07; B29C 17/12
[58] Field of Search .................. 264/89, 90, 92, 94, 264/96, 97, 98, 99, 161, 163, 296; 425/326 B, 387 B, DIG. 214, DIG. 215

[56] References Cited
UNITED STATES PATENTS

| | | | |
|---|---|---|---|
| 3,538,543 | 11/1970 | Nataf | 425/DIG. 214 |
| 3,564,087 | 2/1971 | Ruekberg | 264/89 |
| 3,740,181 | 6/1973 | Uhlig | 264/98 X |

*Primary Examiner*—Jan H. Silbaugh
*Attorney, Agent, or Firm*—Richard D. Heberling; E. J. Holler

[57] ABSTRACT

A method particularly adapted for making pinched-shut, non-blown portions of a blown article, e.g. the non-blown handle openings in a blown plastic jug including engaging a localized portion of a blowable shape, which portion corresponds to a non-blown portion of the final blown article, with a blow mold projection prior to complete enclosure of the blown shape in the blow mold. Such engagement fixes the engaged portion to the blow mold for joint displacement during further blow mold closure. This engagement can be obtained by either (1) specifically shaping the blowable shape for engagement by the mold pinching portions or (2) utilizing retractable abutments carried by the mold itself.

8 Claims, 12 Drawing Figures

METHOD FOR MAKING PLASTIC ARTICLES HAVING BLOWN AND NON-BLOWN PORTIONS

BACKGROUND OF THE INVENTION

In the blow molding of plastic jugs or other handled ware or of structural shapes having reinforcing ribs or the like, substantial difficulty has been involved in providing pinched-shut, non-blown portions of the blown article. For example, in the manufacture of handled articles, the hand hole in the final article is formed by pinching shut a portion of the blowable shape prior to the inflation of the shape interiorly of a closable blow mold. Generally, the blow mold sections are closed into a blowable shape which has been previously "puffed" or radially distended by the injection of a limited volume of air to increase the size of the initial parison to an extent such that the blowable shape can be pinched shut by the blow mold, as in U.S. Pat. No. 3,389,424. Alternatively, the blowable shape may be a blown pre-form, as proposed in U.S. Pat. Nos. 3,740,181 and 3,781,395 assigned to the assignee of the present invention.

In either event, the blowable shape is of sufficient size to encompass the non-blown portion, e.g. the hand hole, of the final container and at least a part of the surrounding blown portions, .e.g. the handle, of the container. This blowable shape is then interposed between a pair of closable blow mold sections, and the mold sections are closed upon the blowable shape to pinch it shut, particularly in the hand-hole area. More, specifically as the blow mold sections close onto the blowable shape, the blowable shape is engaged by pinching projections on each blow mold sections, and these pinching projections pinch shut the periphery of the hand hole opening, so that the material filling the opening will not be blown during subsequent inflation of the blowble shape interiorly of the closed blow mold sections.

During closure of the blow mold sections, any relative movement between the blowable shape and the blow mold sections will upset the material distribution within the final article and any shape-mold misalignment results in a poorly made article. Further, the contact between the blow mold projections and the blowable shape tends to freeze the blowable shape to an extent such that final welding shut of the pinched portion may not occur upon full mold closure. Any failure to weld shut, particularly in fast setting materials, such as polyvinylchloride, will result in a non-sealed container which must be scrapped.

All in all, severe production problems have been encountered in the past in the blow molding of blown articles having pinched-shut, non-blown portions. Such problems include (1) poor material distribution in the final article, (2) relative movement and misalignment between the blowable shape and the blow mold sections, resulting in excessive scrap or inadequate material to form the final article, (3) excessive chilling of the blowable shape prior to full mold closure and blowing, resulting in welding failures, and (4) difficulties in blow molding fast setting materials, such as polyvinylchloride.

BRIEF SUMMARY OF THE INVENTION

The present invention now proposes a new and novel solution to the above described problems in manufacturing blown articles having pinched-shut, non-blown portions.

More specifically, the present invention involves the initial formation of a blowable shape of sufficient size to encompass the non-blown portion and at least a part of the adjacent blown portion. This blowable shape may be formed by conventional puffing techniques, or, preferably, by blow molding a pre-form.

This blowable shape is interposed between a pair of closable blow mold sections. Upon closure of the blow mold sections, the blow mold sections initially contact a portion of the blowable shape corresponding to a non-blown portion of the final article. This initial contact fixed to the blow mold sections a localized portion of the blowable shape to prevent any relative displacement of the blowable shape and the blow mold sections. Further closure of the blow mold sections jointly displaces the fixed portion of the blowable shape and the blow mold sections as the blow mold sections close to fully encompass the blowable shape. Final closure of the blow mold sections pinches shut the non-blown portion of the final article adjacent that portion of the blowable shape which was initially contacted and fixed to blow the non-pinched portions of the blowable shape into the final blown article.

An important feature of the present invention is the initial fixing of a localized area of the blowable shape to the blow mold sections for joint displacement. This can be accomplished by either modifying the shape of the blowable shape to provide a specific mold-engagement portion or by providing retractable abutments on the blow mold sections.

In either case, only limited contact occurs between the blowable shape and the blow mold sections. A provision of such limited contact carried with it the several advantages of the present invention, mainly accurate location of the blowable shape relative to the final shape and better material distribution in the final article because of the prevention of relative movement between the blowable shape and the blow mold sections. Further, contact between the blow mold sections and the blowable shape is kept to a minimum and less cooling occurs due to such contact. Thus, the complete and accurate welding shut of the final pinched portion is assured, even when blow molding fast setting materials, such as polyvinylchloride or the like.

It is, therefore,, an important object of the present invention to provide an improved method of making blown articles having non-blown portions by closing a blow mold onto a blowable shape, and during such closure, locally securing the blowable shape to the mold sections in the region forming a non-blown portion of the final article, and then finally pinching shut the non-blown portions prior to blowing of the remainder of the article.

Another important object to the present invention is the provision of a method of making a blown plastic article having pinched-shut, non-blown portion by closing a pair of blow mold sections onto a blowable shape to sequentially (1) locally secure the blowable shape to the mold sections at a portion of the blowable shape destined to form a pinched portion of the final article, (2) and then jointly moving the mold sections and the blowable shape to pinch shut the remainder of the non-blown portion of the article prior to blowing the final article in surrounding relation to the non-blown portion.

It is a further important object of the present invention to provide a method of making a blown plastic article having a pinched, non-blown portion surrounded by blown portions by forming a blowable shape or preform having an indentation at a portion of the preform corresponding to a non-blown portion of the final article, locally engaging the indentation of the preform with a blow mold section to locally secure the preform to the blow mold section, jointly displacing the mold section and the preform to pinch shut a portion of the preform adjacent the indentation, and then blowing the non-pinched portions of the preform to a final shape.

It is yet another, and no less important, object to the present invention to provide a novel method of making a blown plastic article having a non-blown portion surrounded by blown portions of the article, by interposing a blowable shape between the open sections of a closable blow mold, each mold section having a retractable abutment projecting toward the closing plane of the blow mold sections, closing the blow mold sections on the blowable shape in a single, uninterrupted closing motion to engage the abutments with the blowable shape at locations corresponding to non-blown portions of the final article and closing the blow mold sections onto the blowable shape to pinch shut those portions of the blowable shape surrounding the abutment-engaged portions thereof, and then blowing the non-pinched portions of the blowable shape into a final article.

ON THE DRAWINGS

AS SHOWN ON THE DRAWINGS

Figure 1:
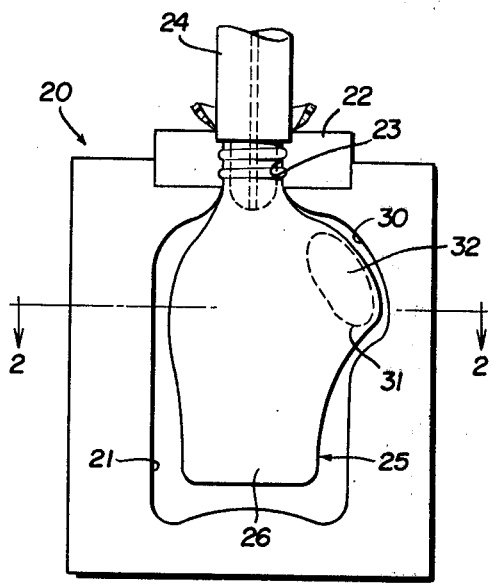
FIG. 1 is a fragmentary elevational view of an apparatus of the present invention capable of carrying out the method of the present invention and illustrating a blown preform positioned intermediate a pair of blow mold sections closable onto the preform.

In FIG. 1, reference numeral 20 refers generally to a blow mold section of the present invention. This blow mold section 20 is one of a pair of such sections illustrated in FIGS. 2 and 3 and closable toward a closing plane P by suitable means, not illustrated.

Figure 2:
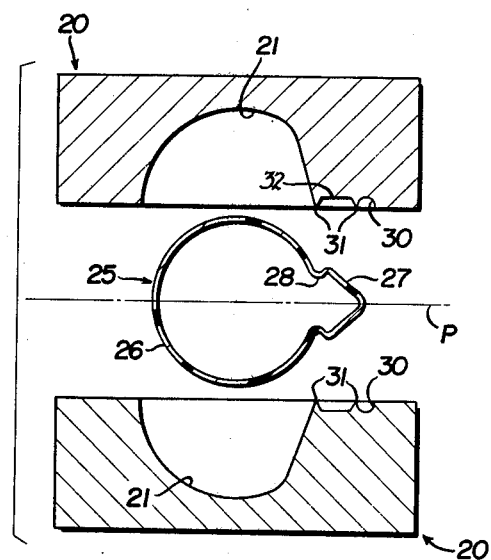
FIG. 2 is a sectional view taken along the plane 2—2 of FIG. 1.

Each blow mold section 20 includes an internal recess 21 of a shape corresponding to one half of the final blown article, in this particular instance a handled container or jug. Surmounting the mold recess 21 is a finish mold section 22 having a finish-defining recess 23. A vertically moveable blow pipe 24 carries at its lower end a blown preform 25, the preform 25 being interposed between the two blow mold sections 20, as illustrated in FIG. 2. The blow pipe 24 is located in the closing plane so that the preform 25 is centrally located between the two blow mold sections 20 when they are opened as illustrated in FIG. 2.

The blow preform 25 is preferably formed as disclosed in my earlier U.S. Pat. Nos. 3,740,181; 3,767,747 and 3,781,395; and the formation of the preform need not be described in detail here. jug will be noted that the preform 25 includes a generally cylindrical body portion 26 having a protruberant projection 27 joined to the body portion 36 through a convex indentation or recess 28. In the formation of the final container, the protruberance 27 will form the handle of the final jub container.

Figure 3:
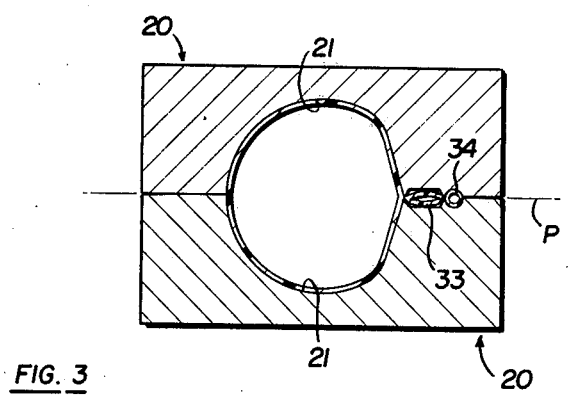
FIG. 3 is a view similar to FIG. 2 illustrating the final closed position of the blow mold sections onto the preform.

The mold recess 21 has a handle-defining convex portion 30 displaced from the major portion 21 of the recess. The portion 30 of the mold recess encompasses a continuous oval pinching projection 31 which surrounds a handle recess 32. When the blow mold sections 20 are closed, as illustrated in FIG. 3, the closed ovalized pinching projection 21 surrounding the recess 32 engages the blown preform 25 to pinch shut a portion of the protruberance 27. This pinched portion is indicated at 33 in FIG. 3, and this pinched portion joins the major portion of the final article filling the major mold recesses 21 to the handle portion 34 filling the handle recesses 30 heretofore described. The pinched portion 33 is subsequently removed by being punched out to form the hand-receiving aperture in the fine handled jug.

Figure 4:
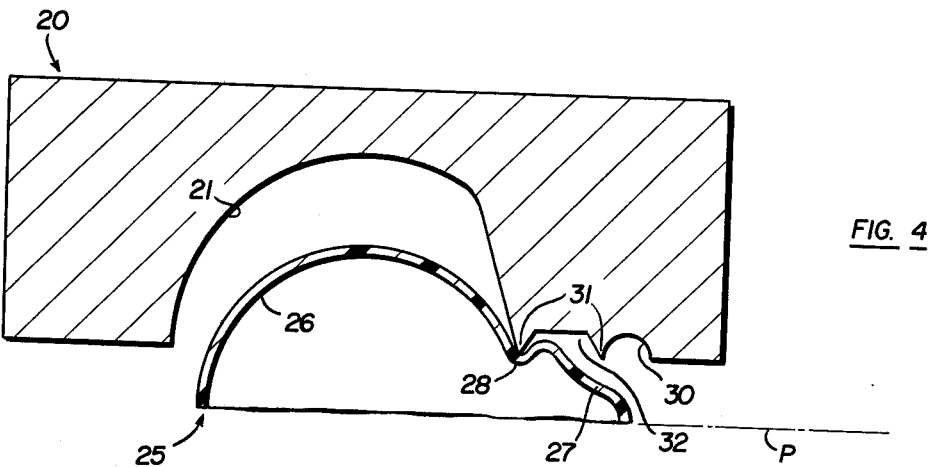
FIGS. 4, 5 and 6 are fragmentary enlarged sectional views similar to FIGS. 2 and 3, but for purposes of clarity, illustrating a single blow mold section closable onto the blow preform to carry out the method of the present invention.
Figure 5:
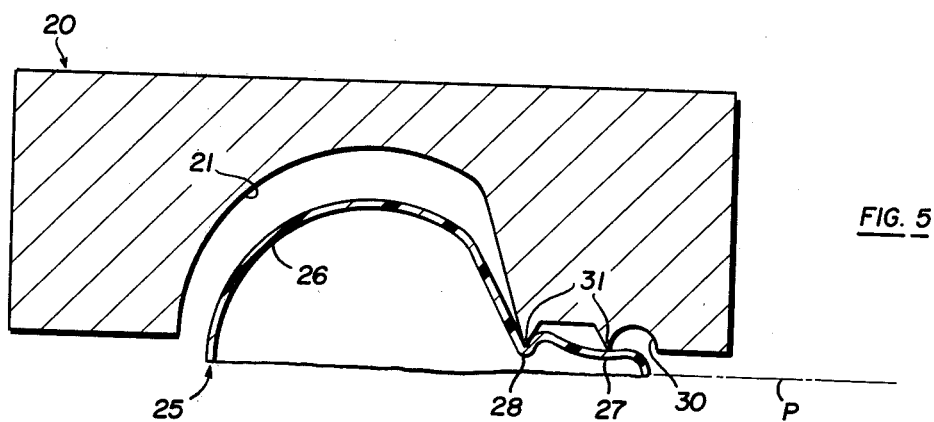
Figure 6:
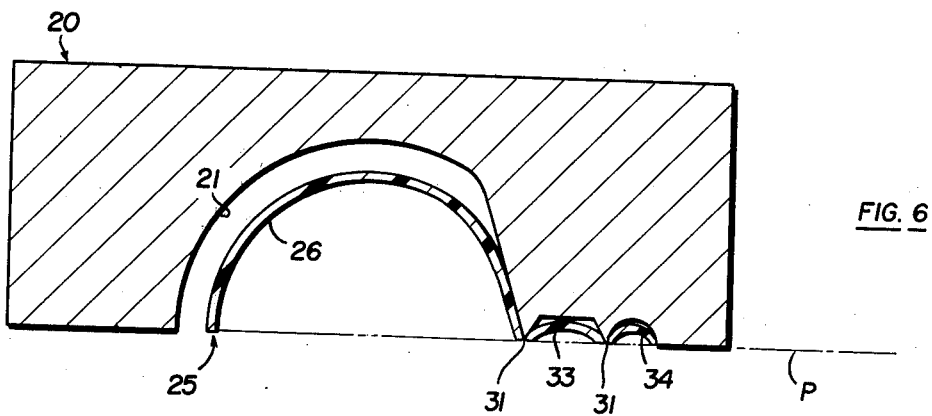
Figure 7:
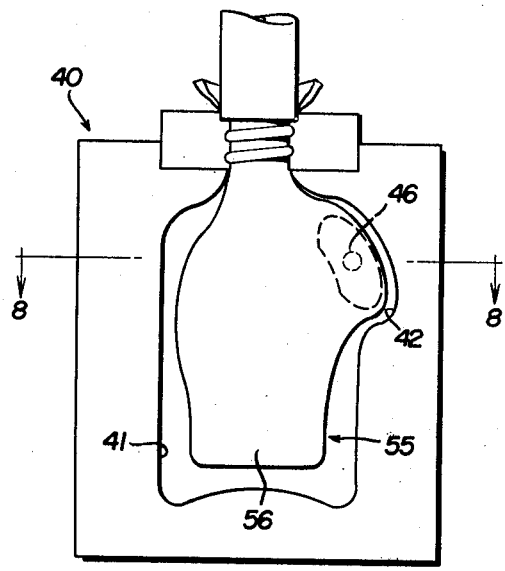
FIG. 7 is a view similar to FIG. 1 showing a modified form of apparatus of the present invention capable of carrying out a modified method of the present invention.

Turning now to FIGS. 4, 5, and 6 it will be seen that only one mold section 20 is illustrated in each of these figures, and the progressing closing movements of this mold section 20 toward the closure plane P is shown. It will be appreciated that the two mold sections 20 of FIG. 2 close jointly onto the closure plane P, but the mode of illustration of FIGS. 4, 5, and 6 has been adopted for purposes of clarity.

As earlier explained in connection with FIG. 2, the blown preform 25 is interposed between the two blow mold sections 20, the preform being axially aligned with the closure plane P. The two mold sections 20 close onto the preform 25 in a single, uninterrupted closing movement. Initial contact between each mold section 20 and the preform 25 takes place as illustrated in FIG. 4 of the drawings. More specifically, the inner pinching projection 31 of each mold section 20 contacts the preform at the location of the indentation or notch 28. It will be appreciated that the blown preform 20 is still at an elevated temperature and is still blowable. Contact with the projections 31 will chill the preform 25 at the localized area of the indentation 28, and the telescopic contact of the projection 31 in the indentation 28 will serve to fix the blown preform 25 to the blow mold section 20 during further closing movement of the blow mold sections. It will be noted that the dimensions of the blown preform 20 relative to the remainder of the mold recess 21 are such that no other contact between the blow mold section and the blown preform occurs at the time of the initial contact of FIG. 4.

Upon further closing movement of the blow mold sections 20 toward one another, the condition of FIG. 5 is attained, wherein contact between the entire ovalized edge 31 and the preform projection 27 is accomplished. Preferably, there is no other contact between the blown preform 25 and the mold section 20. In this manner, the formation of peripheral pinch flash is prevented. Further, there will be no sliding movement or other relative displacement between the blown preform 25 and the mold sections 20 because of the initial fixing of the preform to the inner portion of the projection 31 as described in connection with FIG. 4.

In FIG. 6, the one blow mold section 20 and the blown preform 25 are illustrated in their relative positions when the blow mold is completely closed, and the two sections abut one another along the closure plane P. At this time, the ovalized projection 31 confines and encompasses the non-blown portion of the preform 25, and the preform is pinched shut completely along the edge 31. It will be noted that this pinching shut takes place immediately adjacent the indentation 28 and that portion of the preform protruberance 27 not contacted by the ovalized edge 31 is positioned interiorly of the handle recess 30, as at 34.

Next, blow air is introduced through the blow pipe 24 into the blown preform 25 which is fully enclosed within the closed blow mold sections 20, and the preform is inflated to its final configuration as illustrated in FIG. 3 of the drawings.

In FIGS. 7–12, a modified form of the invention is illustrated. Here, a different, modified pair of closable blow mold sections 40 are provided. These blow mold sections 40 each have an interior recess 41 defining one half the body of the final finished container. Once again, each recess 41 is in full communication with a protuberant handle recess portion 42 surrounding an ovalized pinching projection 43 similar to the projection 31 earlier described.

However, each mold section carries an abutment indicated generally at 45, each such abutment comprising a cylindrical pin 46 provided with an enlarged head 47, the pin being slidable in a guide aperture 48 formed in the body of the mold section 40. The head 47 of the pin 46 is confined in an enlarged bore 49 also formed in the mold section 40 and urged downwardly in the bore 49 by a compression spring 50 located in the bore and bottomed against a closure plate 51 closing the upper end of the bore 49 and fixedly secured to the mold half 40. The pin guide aperture 48 opens onto the oval recess 52 to be surrounded by the oval pinching edge 43, and each pin 45 projects beyond its mold half 40 toward the closure plane P of the mold halves 40.

Figure 8:
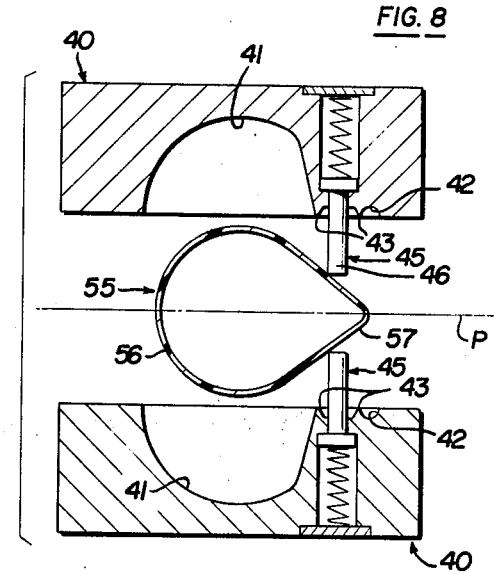
FIG. 8 is a sectional view similar to FIG. 2 and taken along the plane 8—8 of FIG. 7.
Figure 9:
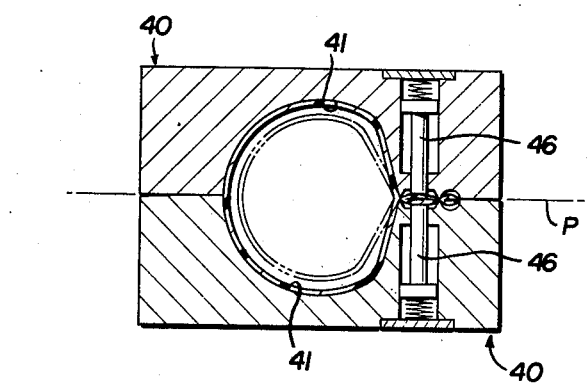
FIG. 9 is a view similar to FIG. 3 illustrating the final step of the modified method of the present invention.

As illustrated in FIG. 8, the preform or blowable shape 55 again is preferably pre-blown, as was the preform 25 heretofore described. However, the preform 55 need not have the notch 28. Rather, the preform 55 comprises a main, semicylindrical body portion 56 and a somewhat conical, outwardly convergent, protruding projection 57 interposed between the pins 45 and the pinching projections 43 of the mold sections 40.

Figure 10:
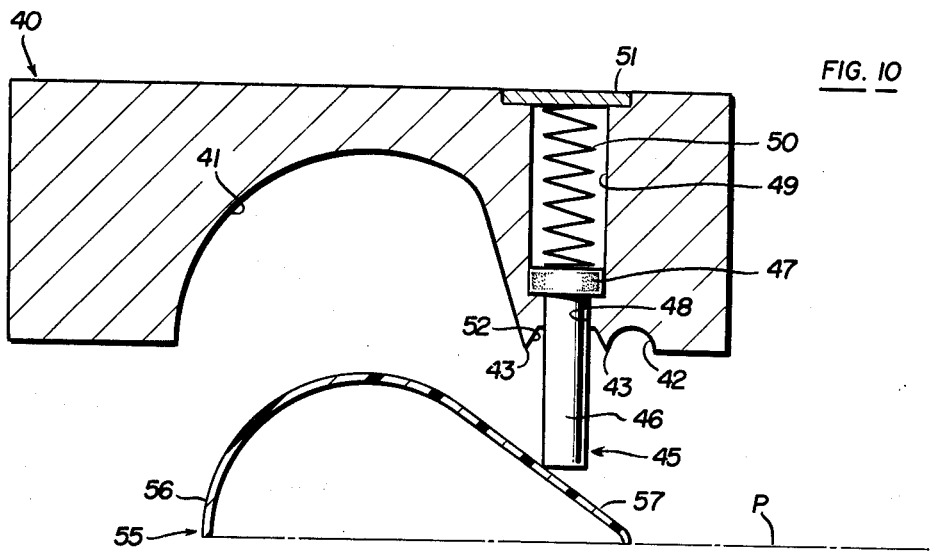
FIGS. 10–12 are views similar to FIGS. 4, 5 and 6 illustrating the modified method of the present invention.
Figure 11:
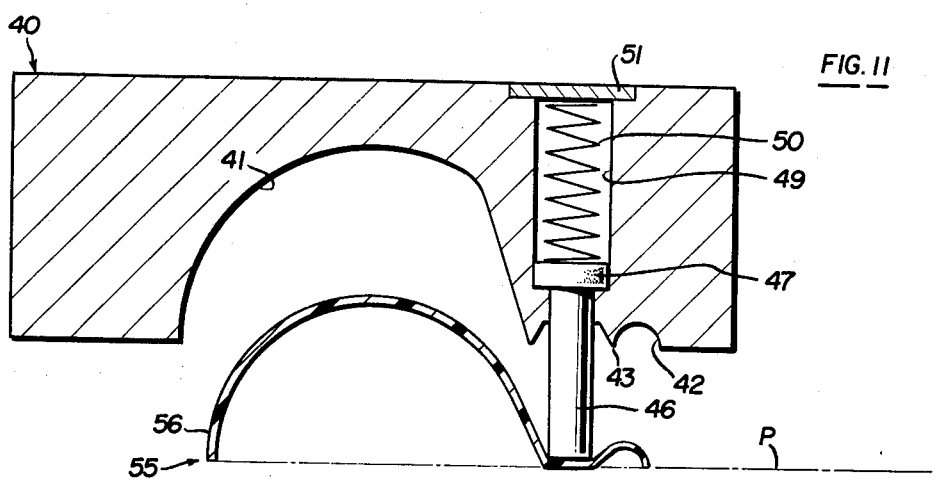
Figure 12:
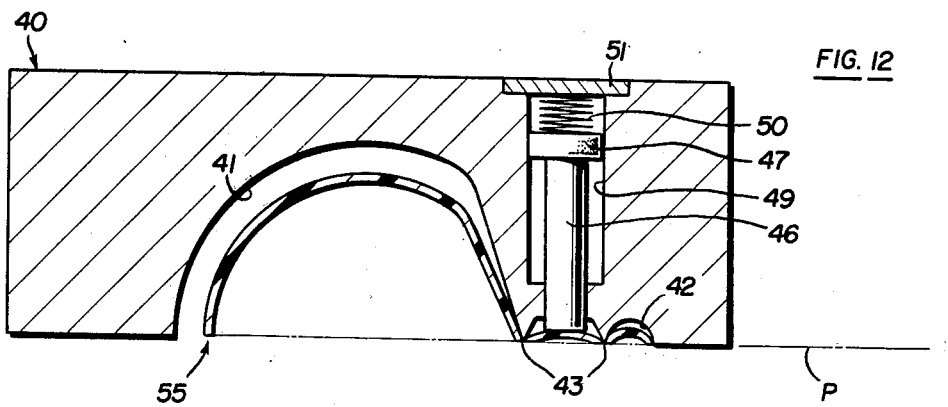

The operation of the embodiment of FIGS. 7–12 is best illustrated in FIGS. 10–12. Upon initial closure of the blow mold sections toward the closure plane P, the pins 45 projecting inwardly toward one another initially contact the protruding portion 57 of the preform 55 at that region of the preform 55 destined to be finally pinched shut by the oval pinching edge 43. Since the pins 45 project toward one another, and toward the closing plane P, the pins will contact and deflect the preform to the closure plane before there is any further contact between the mold sections 40 and the preform 55.

As illustrated in FIG. 11, the two pins 46 of the two mold sections 40 will initially confine the contacted portion of the preform therebetween. Subsequent closing movement of the mold sections 40 onto the preform will be accomodated by telescopic movement of the pins 46 into the recesses 49 against the compression force of the springs 50, as will be apparent from a comparison of FIGS. 11 and 12. The initial contact between the pins or abutments 45 and the preform 55 will retain the preform in the position relative to the mold sections 40, while chilling only that portion of the preform which is eventually confined within the oval pinching edge 43, also as best illustrated in FIG. 12. The resultant stabilization and precise location of the blown preform relative the closing mold sections 40, the prevention of chilling of those portions of the preform to be pinched shut by the edges 43, and the minimal mold-preform contact prior to blowing will insure the accurate location and registration of the blowable shape relative to the final shape and will insure the welding shut of the non-chilled final pinched-shut portions of the preform contacted by the edges 43.

Thus, it will be appreciated that the present invention provides an improved method of an apparatus for making blown plastic particles having non-blown portions. The stabilization of the blowable shape between the closing mold sections by initial, limited contact between the blowable shape and the closing blow mold sections will be readily appreciated. In the case of the embodiment of the invention shown in FIGS. 1 through 6, this minimal contact is affected by entry of the pinching projection 31 into the indentation 28 of the blowable shape 25; in the embodiment of the invention illustrated in FIGS. 7–12, this minimal contact is accomplished by contact between the retractable abutments 45 and the blowable shape 55. In both forms of the invention, the blowable shape is accurately located between the closing blow modes to insure registration of the blowable shape with the final shape defined by the completed blow mold cavity formed when the blow mold sections meet at the plane P. The minimal contact between the blowable shape and the blow mold sections minimizes any cooling prior to the final pinching shut of portions of the blowable shape by the pinching edges 43, 31, and this minimal contact insures the welding shut of the final pinched portion even when blow molding fast setting materials, such as polyvinylchloride.

I claim:

1. In a method of making a blown plastic article having contiguous non-blown and blown portions, the non-blown portion being surrounded by the blown portion, the steps of (1) forming a blowable shape including an indentation, (2) positioning the blowable shape between the open sections of a closable blow mold, (3) closing the blow mold sections on said blowable shape, (a) initial closing movmement of said mold sections locally engaging the indentation in the blowable shape with pinching projections on the mold sections, chilling the engaged portion to secure that portion to the pinching projections, and deflecting the indentation and (b) further joint closing movement of said mold sections and said blowable shape engaging and pinching shut the remainder of the blowable shape portion which will become the non-blown portion, and (4) blowing the blowable shape to the blown portions of the article interiorly of said mold in contiguous relation to the pinched-shut, non-blown portion.

2. In a method of making a blowm plastic container having a blown peripheral handle extension adjacent a non-blown hand hole, the steps of forming a blowable shape smaller than the final article but of an extent sufficient to encompass the hand hole and at least a part of the handle extension, the blowable shape having a localized indentation at a location destined to become the non-blown hand hole, positioning the blowable shape between the open sections of a closable blow mold having pinching edges circumscribing that portion of the blowable shape destined to form the hand hole, closing the blow mold sections in said blowable shape (1) to initially engage a portion of the pinching edges of each mold sections with the indentation in the blowable shape to fix the indentation to the engaged portion of the pinching edges, and (2) subsequently to fully engage the mold section pinching edges with the blowable shape immediately adjacent the indentation, and finally blowing the blowable shape interiorly of the closed mold sections to form the container and the blown handle.

3. In a method of making a blown plastic article having a non-blown portion completely surrounded by blown portions of the article, the steps of (1) forming a blowable shape of an extent sufficient to encompass the destined non-blown portion of the final article, (2) positioning the blowable shape between the open sections of a closable blow mold, (3) closing the blow mold sections on said blowable shape, (a) initial closing movement of said mold sections locally engaging, deforming, stabilizing and pinching shut a portion of the blowable shape prior to complete closure of the blow mold sections, the engaged portion of the blowable shape corresponding to a part only of the non-blown portion of the final article and being completely surrounded by a portion of the blowable shape that is destined to become the blown portion of the article, and (b) further closing movement of said mold sections engaging the mold sections with the blowable shape to pinch shut the blowable shape completely around the previously engaged, deformed portion by a pair of opposed, similarly shaped mold projections thereby defining the non-blown portion, and (4) blowing the blowable shape interiorly of said closed mold sections to form the blown portions of the article completely surounding the engaged, non-blown portions.

4. In a method of making a blown plastic article having blown portions and a pinched, non-blown portion, the steps of forming a blowable shape having a pair of generally opposed indentations at locations destined to become the non-blown portions, progressively enclosing the blowable shape in a blow mold (1) to initially locally engage the opposed indentations (2) to secure the indentations to that portion of the blow mold which they initially engage, (3) to then deflect the locally engaged preform indentations toward one another and (4) to pinch shut that portion of the blowable shape destined to become the entire non-blown portion of the final article including that portion engaged in Step (1) above, as the mold sections close to said closing plane, and then blowing the non-pinched portions of said blowable shape to define the final article.

5. In a method of making a blown plastic article having a non-blown portion, the steps of (1) blow molding a pre-form having a surface indentation at a location which will become a portion of said non-blown portions, (2) positioning the pre-form between the open sections of a closable blow mold, (3) closing the blow mold sections on said pre-form, with the initial closing movement of said mold sections engaging at least one of the blow mold sections with the surface indentation of said preform to fix the indentation to that portion of blow mold section which it engages, and with further closing movement of said mold sections engaging and pinching shut additional portions of the pre-form contiguous to said surface indentation, and (4) blowing the non-pinched portions of the pre-form interiorly of said closed mold sections to form the blown portions of the article 6. In a method of making a blown plastic article having a non-blown portion encompassed by blown portions of the article, the steps of blow-molding a blowable pre-form smaller than the final article but of an extent sufficient to encompass the destined non-blown portion of the final article and having a localized indentation at a location corresponding to the location of a portion only of the destined non-blown portion, positioning the blowable pre-form between the open sections of a closable blow mold, closing the blow mold sections on said blowable pre-form (1) to initially engage each mold section with only the indentation of the blowable pre-form, thereby fixing the pre-form to each blow mold section and (2) subsequently to pinch shut additional portions of the pre-form immediately adjacent the indentation to define the non-blown portion of the final article, and finally blowing the pre-form interiorly of the closed blow mold sections to form the blown portions of the final article.

7. In a method of making a blown plastic article having a non-blown portion encompassed by blown portions of the article, the steps of forming a blowable shape smaller than the final article but of an extent sufficient to encompass the destined non-blown portion of the final article and having a localized indentation at a location corresponding to the location of the non-blown portion of the final article, positioning the blowable shape between the open sections of a closable blow mold, closing the blow mold on said blowable shape (1) to initially engage a projection on the mold with the indentation in the blowable shape, thereby fixing the engaged portion of the blowable shape to the blow mold section and (2) subsequently to pinch shut the blowable shape at a location corresponding to the non-blown portions of the final article immediately adjacent the indentation, and finally blowing the blowable shape to form the blown portion of the article interior of said mold in surrounding relation to the pinched-shut, non-blown portion including said indentation.

8. In a method of making a blown plastic article having a non-blown portion surrounded by blown portions of the article, the steps of forming a blowable shape smaller than the final article but of an extent sufficient to encompass the non-blown portion, positioning the blowable shape between the open sections of a closable blow mold, each section having a retractable abutment projecting toward the closing plane of the mold sections, closing the blow mold on the blowable shape in a single uninterrupted closing motion (1) to engage the abutments with the blowable shape at a location corresponding to a portion thereof destined to become a non-blown portion of the final article, thereby fixing the engaged portion to each mold section, (2) to confine the abutment-contacted portions between the cooperating abutments, thereby pinching shut said confined portions prior to full mold closure, the projections retracting as the mold sections approach their fully closed position and (3) to fully close the blow mold sections to pinch shut those portions of the blowable shape surrounding the abutments, and finally blowing the blowable shape interiorly of the closed blow mold sections in surrounding relation to the engaged, pinched-shut portion to form the blown portions of the article.

* * * * *